(12) United States Patent
Pope et al.

(10) Patent No.: US 10,397,103 B2
(45) Date of Patent: *Aug. 27, 2019

(54) DATA PROCESSING SYSTEM WITH ROUTING TABLES

(71) Applicant: Solarflare Communications, Inc., Irvine, CA (US)

(72) Inventors: Steven Leslie Pope, Costa Mesa, CA (US); David James Riddoch, Fenstanton (GB); Greg Law, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,696

(22) Filed: Aug. 25, 2016

(65) Prior Publication Data

US 2016/0366054 A1  Dec. 15, 2016

Related U.S. Application Data

(60) Continuation of application No. 14/519,065, filed on Oct. 20, 2014, now Pat. No. 9,729,436, which is a
(Continued)

(30) Foreign Application Priority Data

Mar. 30, 2005 (GB) .................................. 0506403.5

(51) Int. Cl.
*H04L 29/06* (2006.01)
*G06F 15/16* (2006.01)
(Continued)

(52) U.S. Cl.
CPC .............. *H04L 45/54* (2013.01); *H04L 45/00* (2013.01); *H04L 45/021* (2013.01); *H04L 45/56* (2013.01); *H04L 45/745* (2013.01); *H04L 69/16* (2013.01)

(58) Field of Classification Search
CPC ...... H04L 45/54; H04L 45/745; H04L 45/021
(Continued)

(56) References Cited

U.S. PATENT DOCUMENTS 4,574,350 A   3/1986  Starr
5,272,599 A   12/1993 Koenen
(Continued)

FOREIGN PATENT DOCUMENTS

EP   598510   5/1994
EP   620521   3/1995
(Continued)

OTHER PUBLICATIONS

"A Small IP Forwarding Table Using Hashing"—Chang et al, Department of Computer Science and Information Engineering, National Cheng Kung University, Aug. 2004 http://citeseerx.ist.psu.edu/viewdoc/download?doi=10.1.1.559.2213&rep=rep1&type=pdf.*
(Continued)

*Primary Examiner* — Randy A Scott
(74) *Attorney, Agent, or Firm* — Wolf, Greenfield & Sacks, P.C.

(57) ABSTRACT

A data processing system with routing tables comprising an operating system for supporting processes, such that the process are associated with one or more resources and the operating system being arranged to police the accessing by processes of resources so as to inhibit a process from accessing resources with which it is not associated. Part of this system is an interface for interfacing between each
(Continued)

process and the operating system and a memory for storing state information for at least one process. The interface may be arranged to analyze instructions from the processes to the operating system, and upon detecting an instruction to re-initialize a process cause state information corresponding to that pre-existing state information to be stored in the memory as state information for the re-initialized process and to be associated with the resource.

22 Claims, 2 Drawing Sheets

Related U.S. Application Data continuation of application No. 11/982,109, filed on Oct. 31, 2007, now Pat. No. 8,868,780, which is a division of application No. 11/900,377, filed on Sep. 10, 2007, now Pat. No. 8,650,569, which is a continuation of application No. PCT/GB2006/000852, filed on Mar. 10, 2006.

(51) Int. Cl.
  *G06F 15/173* (2006.01)
  *H04L 12/741* (2013.01)
  *H04L 12/701* (2013.01)
  *H04L 12/771* (2013.01)
  *H04L 12/755* (2013.01)

(58) Field of Classification Search
  USPC ........ 709/202, 220, 223, 224, 225; 370/289, 370/351, 401
  See application file for complete search history.

(56) References Cited

U.S. PATENT DOCUMENTS

| | | |
|---|---|---|
| 5,325,532 A | 6/1994 | Crosswy et al. |
| 5,448,739 A | 9/1995 | Jacobson |
| 5,452,455 A | 9/1995 | Brown et al. |
| 5,535,216 A | 7/1996 | Goldman et al. |
| 5,535,416 A | 7/1996 | Feeney et al. |
| 5,550,816 A | 8/1996 | Hardwick et al. |
| 5,603,020 A | 2/1997 | Hashimoto et al. |
| 5,634,124 A | 5/1997 | Khoyi et al. |
| 5,671,442 A | 9/1997 | Feeney et al. |
| 5,680,586 A | 10/1997 | Elkins et al. |
| 5,742,817 A | 4/1998 | Pinkoski |
| 5,946,189 A | 8/1999 | Koenen et al. |
| 6,021,446 A | 2/2000 | Gentry, Jr. |
| 6,070,219 A | 5/2000 | McAlpine et al. |
| 6,085,217 A | 7/2000 | Ault et al. |
| 6,098,112 A | 8/2000 | Ishijima et al. |
| 6,145,088 A | 11/2000 | Stevens |
| 6,160,554 A | 12/2000 | Krause |
| 6,170,018 B1 | 1/2001 | Voll et al. |
| 6,304,945 B1 | 10/2001 | Koenen |
| 6,349,035 B1 | 2/2002 | Koenen |
| 6,356,951 B1 | 3/2002 | Gentry, Jr. |
| 6,415,333 B1 | 7/2002 | Vasell |
| 6,424,621 B1 | 7/2002 | Ramaswamy et al. |
| 6,438,130 B1 | 8/2002 | Kagan et al. |
| 6,484,224 B1 | 11/2002 | Robins et al. |
| 6,502,203 B2 | 12/2002 | Barron et al. |
| 6,530,007 B2 | 3/2003 | Olarig et al. |
| 6,539,027 B1 | 3/2003 | Cambron |
| 6,560,613 B1 | 5/2003 | Gylfason et al. |
| 6,667,918 B2 | 12/2003 | Leader et al. |
| 6,675,200 B1 | 1/2004 | Cheriton et al. |
| 6,687,762 B1 | 2/2004 | Van Gaasbeck et al. |
| 6,687,849 B1 | 2/2004 | Cherf |
| 6,718,392 B1 | 4/2004 | Krause |
| 6,728,743 B2 | 4/2004 | Shachar |
| 6,732,211 B1 | 5/2004 | Goyal et al. |
| 6,735,642 B2 | 5/2004 | Kagan et al. |
| 6,744,652 B2 | 6/2004 | Srinivasan et al. |
| 6,751,701 B1 | 6/2004 | Pereira |
| 6,768,992 B1 | 7/2004 | Jolitz |
| 6,768,996 B1 | 7/2004 | Steffens et al. |
| 6,785,888 B1 | 8/2004 | McKenney et al. |
| 6,904,534 B2 | 6/2005 | Koenen |
| 6,950,961 B2 | 9/2005 | Krause et al. |
| 6,978,331 B1 | 12/2005 | Kagan et al. |
| 7,082,563 B2 | 7/2006 | Gemelli et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,236,740 B2 | 6/2007 | Koo et al. |
| 7,240,350 B1 | 7/2007 | Eberhard et al. |
| 7,245,627 B2 | 7/2007 | Goldenberg et al. |
| 7,251,736 B2 | 7/2007 | Dayan et al. |
| 7,254,237 B1 | 8/2007 | Jacobson et al. |
| 7,285,996 B2 | 10/2007 | Fiedler |
| 7,299,266 B2 | 11/2007 | Boyd et al. |
| 7,313,667 B1 | 12/2007 | Pullela et al. |
| 7,316,017 B1 | 1/2008 | Jacobson et al. |
| 7,325,007 B2 | 1/2008 | Castro et al. |
| 7,346,702 B2 | 3/2008 | Haviv |
| 7,356,818 B2 | 4/2008 | Carollo et al. |
| 7,386,619 B1 | 6/2008 | Jacobson et al. |
| 7,403,535 B2 | 7/2008 | Modi et al. |
| 7,404,190 B2 | 7/2008 | Krause et al. |
| 7,408,933 B2 * | 8/2008 | Oh .......................... H04L 45/02 370/392 |
| 7,447,861 B2 | 11/2008 | Burka |
| 7,483,433 B2 | 1/2009 | Simmons et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,835,380 B1 | 11/2010 | Aloni et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0001302 A1 | 1/2002 | Picket |
| 2002/0032806 A1 | 3/2002 | Machin et al. |
| 2002/0059052 A1 | 5/2002 | Bloch et al. |
| 2002/0067722 A1 | 6/2002 | Kanakubo |
| 2002/0075809 A1 | 6/2002 | Phaal |
| 2002/0112139 A1 | 8/2002 | Krause et al. |
| 2002/0124108 A1 | 9/2002 | Terrell et al. |
| 2002/0129293 A1 | 9/2002 | Hutton et al. |
| 2002/0140985 A1 | 10/2002 | Hudson |
| 2002/0152226 A1 | 10/2002 | Burnett |

(56) References Cited

U.S. PATENT DOCUMENTS

| | | | |
|---|---|---|---|
| 2002/0156784 A1 | 10/2002 | Hanes et al. | |
| 2003/0007165 A1 | 1/2003 | Hudson | |
| 2003/0051048 A1* | 3/2003 | Watson | H04L 45/00 709/238 |
| 2003/0058459 A1 | 3/2003 | Wu et al. | |
| 2003/0061345 A1 | 3/2003 | Kawasaki et al. | |
| 2003/0063299 A1 | 4/2003 | Cowan et al. | |
| 2003/0065856 A1 | 4/2003 | Kagan et al. | |
| 2003/0076837 A1* | 4/2003 | Whitehill | H04L 29/12009 370/395.4 |
| 2003/0081060 A1 | 5/2003 | Zeng et al. | |
| 2003/0165144 A1 | 9/2003 | Wang | |
| 2003/0169738 A1 | 9/2003 | McDaniel | |
| 2003/0172330 A1 | 9/2003 | Barron et al. | |
| 2003/0182465 A1 | 9/2003 | Moir et al. | |
| 2003/0185221 A1 | 10/2003 | Deikman et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2003/0233514 A1 | 12/2003 | Honig | |
| 2004/0010612 A1 | 1/2004 | Pandya | |
| 2004/0037299 A1 | 2/2004 | Pandya | |
| 2004/0054813 A1 | 3/2004 | Boucher et al. | |
| 2004/0071250 A1 | 4/2004 | Bunton et al. | |
| 2004/0141642 A1 | 7/2004 | Zeng et al. | |
| 2004/0158793 A1 | 8/2004 | Blightman et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0205441 A1 | 10/2004 | Oren | |
| 2004/0210754 A1 | 10/2004 | Barron et al. | |
| 2004/0210906 A1 | 10/2004 | Beresnevichiene et al. | |
| 2004/0223462 A1 | 11/2004 | Cromer et al. | |
| 2004/0252685 A1 | 12/2004 | Kagan et al. | |
| 2004/0264384 A1* | 12/2004 | Deval | H04L 45/02 370/252 |
| 2005/0008223 A1 | 1/2005 | Zeng et al. | |
| 2005/0018221 A1 | 1/2005 | Zeng et al. | |
| 2005/0021558 A1 | 1/2005 | Beverly et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0102688 A1 | 5/2005 | Suwa et al. | |
| 2005/0114855 A1 | 5/2005 | Baumberger | |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2005/0286519 A1 | 12/2005 | Ravikumar et al. | |
| 2006/0015700 A1 | 1/2006 | Burka | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0155801 A1 | 7/2006 | Brabson | |
| 2006/0165074 A1 | 7/2006 | Modi et al. | |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0110034 A1 | 5/2007 | Bennett | |
| 2007/0118700 A1 | 5/2007 | Mensching et al. | |
| 2007/0124545 A1 | 8/2007 | Blanchard et al. | |
| 2007/0188351 A1 | 8/2007 | Brown et al. | |
| 2007/0189284 A1 | 8/2007 | Kecskemeti | |
| 2007/0220183 A1 | 9/2007 | Kagan et al. | |
| 2008/0024586 A1 | 1/2008 | Barron | |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0140618 A1 | 6/2008 | Kumar | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2008/0310340 A1 | 12/2008 | Isozu | |
| 2009/0116406 A1 | 5/2009 | Suzuki et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0302923 A1 | 12/2009 | Smeloy et al. | |
| 2010/0088437 A1 | 4/2010 | Zahavi | |
| 2010/0138840 A1 | 6/2010 | Kagan et al. | |
| 2010/0169880 A1 | 7/2010 | Haviv et al. | |
| 2010/0174831 A9 | 7/2010 | Elzur | |
| 2010/0188140 A1 | 7/2010 | Smelloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |

FOREIGN PATENT DOCUMENTS

| | | |
|---|---|---|
| EP | 658837 | 6/1995 |
| EP | 743777 | 11/1996 |
| EP | 1336915 | 8/2003 |
| EP | 2272214 | 1/2011 |
| WO | 2000/52869 | 9/2000 |
| WO | 2001/048972 | 7/2001 |
| WO | 2002/035838 | 5/2002 |
| WO | 2003/104943 | 12/2003 |
| WO | 2004/017220 | 2/2004 |
| WO | 2008/127672 | 12/2008 |
| WO | 2009/136933 | 11/2009 |
| WO | 2010/020907 | 7/2010 |
| WO | 2010/087826 | 8/2010 |
| WO | 2011/043768 | 4/2011 |
| WO | 2011/053305 | 5/2011 |
| WO | 2011/053330 | 5/2011 |

OTHER PUBLICATIONS

TCP Servers: Offloading TCP Processing in Internet Servers. Design, Implementation, and Performance, Technical Report DCR-TR-48L Computer Science Department, Rutgers University, Murali Rangarajan, et al., Mar. 2002.

ATM: A Retrospective on Systems Legacy, ACM Computer Communication Review, vol. 32, No. 5, Jon Crowcroft and Derek McAuley, Nov. 2002.

A Retrospective View of ATM, ACM Computer Communication Review, vol. 32, No. 5, pp. 13-19, Charles Kalmanek, Nov. 2002.

The Influence of ATM on Operating Systems, ACM Computer Communication Review, vol. 32, No. 5, pp. 29-37, Jonathan Smith, Nov. 2002.

An Overview of the BlueGene/L Supercomputer, Proceedings of the 2002 ACM/IEEE conference on Supercomputing, pp. 1-22, Baltimore, NR Adiga, et al., Nov. 16, 2002.

Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.

(56) References Cited

OTHER PUBLICATIONS

Some Internet Architectural Guidelines and Philosophy, IETF Network Working Group, Request for Comments: 3439, R. Bush, D. Meyer, Dec. 2002.
F-RTO: An Enhanced Recovery Algorithm for TCP Retransmission Timeouts, ACM Computer Communication Review, vol. 33, No. 2, Pasi Sarolahti, et al., Apr. 2003.
Scalable TCP: Improving Performance in Highspeed Wide Area Networks, ACM Computer Communication Review, vol. 33, No. 2, pp. 83-91, Tom Kelly, Apr. 2003.
TCP offload is a dumb idea whose time has come, Proceedings of HotOS IX: The 9th Workshop on Hot Topics in Operating Systems, pp. 25-30, Jeffrey C. Mogul May 18, 2003.
A case for Virtual Channel Processors, Proceedings of the ACM SIGCOMM 2003 Workshops, Derek McAuley and Rolf Neugebauer, Aug. 2003.
Initial End-to-End Performance Evaluation of 10-Gigabit Ethernet, Proceedings of the 11th Symposium on High Performance Interconnects, Justin Hurwitz and Wu-chun Feng, Aug. 20, 2003.
Workshop on network-I/O convergence: experience, lessons, implications (NICELI), ACM Computer Communication Review, vol. 33, No. 5, Vinay Aggarwal, et al., Oct. 2003.
Optimizing 10-Gigabit Ethernet for Networks ofWorkstations, Clusters, and Grids: A Case Study, Proceedings of the 2003 ACM/IEEE conference on Supercomputing, Phoenix, Arizona, Wu-chun Feng, et al., Nov. 15, 2003.
Performance Comparison of MPI Implementations over InfiniBand, Myrinet and Quadrics, Proceedings of the 2003 ACM/IEEE conference on Supercomputing, Phoenix, Arizon, Jiuxingn Lium et al., Nov. 15, 2003.
Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.
Fast TCP: Motivation, Architecture, Algorithms, Performance, Proceedings of IEEE Infocom, pp. 1246-1259, Cheng Jin, et al., Mar. 7, 2004.
TCP Offload to the Rescue, ACM Queue, vol. 2, No. 3, Andy Currid, May 1, 2004.
TCP Unloading for Data Center Servers, Computer, IEEE Computer Society, vol. 37, No. 11, pp. 48-58, Greg Regnier, et al., Nov. 2004.
Declaration of Dr Gregory L Chesson in *Alacritech v. Microsoft*, United States District Court, Northern District California, San Francisco Division, Gregory L. Chesson, Feb. 4, 2005.
Computing Research: A Looming Crisis, ACM Computer Communication Review, vol. 35, No. 2, Edward D. Lazowska and David A. Patterson, Jul. 2005.
Performance Characterization of a 10-Gigabit Ethernet TOE, Proceedings of the 13th Symposium on High Performance Interconnects, W. Feng, et al., Aug. 17, 2005.
User-level device drivers: Achieved performance, J. Comput. Sci. & Technol., vol. 20, B. Leslie, et al., Sep. 2005.
Head-to-TOE Evaluation of High-Performance Sockets Over Protocol Offload Engines, Proceedings of the IEEE International Conference on Cluster Computing, P. Balaji, et al., Sep. 2005.
SCTP versus TCP for MPI, Proceedings of the 2005 ACM/IEEE conference on Supercomputing, Seattle, p. 30, Washington, Humaira Kamal, et al., Nov. 12, 2005.
LTCP: Improving the Performance of TCP in Highspeed Networks, ACM Computer Communication Review, vol. 36, No. 1, pp. 41-50, Sumitha Bhandarkar, et al., Jan. 2006.
Zero-Copy TCP in Solaris, Proceedings of the USENIX Annual Technical Conference, H. K. Jerry Chu, Jan. 1996.
Reflections on Network Architecture: an Active Networking Perspective, ACM Computer Communication Review, vol. 36, No. 2, pp. 27-30, Ken Calvert, Apr. 2006.
10 Networking Papers: Recommended Reading, ACM Computer Communication Review, vol. 36, No. 2, pp. 51-52, Jon Crowcroft, Apr. 2006.

Flow labelled IP over ATM: design and rationale, ACM Computer Communication Review, vol. 36, No. 3, pp. 79-92, Greg Minshall, et al., Jul. 2006.
10 Networking Papers: Readings for Protocol Design, ACM Computer Communication Review, vol. 36, No. 3, pp. 77-78, David Wetherall, Jul. 2006.
A Critique of RDMA, HPCWire article: http://www.hpcwire.com/features/17886984.html,Patrick Geoffray, Aug. 18, 2006.
The NE010 iWARP Adapter, Open Fabrics Alliance, Gary Montry, May 2006.
Protocol Onload vs. Offload, Intel, Greg Regnier, Date Unknown.
Protocol Onloading vs. Offloading in High Performance Networks, Pacific Northwest Laboratories by Batelle for the U.S. Department of Energy, Fabrizio Petrini, Date Unknown.
Thoughts about TCP Offloading, My 2003 HotOS paper title: TCP Offload is a dumd idea whose time has to come, HP Labs (Not speaking for HP), Jeff Mogul, Aug. 2006.
Protocol Offloading vs. Onloading in High Performance Networks, Hot Interconnect Panel, System Interconnect Group, Qlogic Corporation, Lloyd Dickman CTO, Aug. 23, 2006.
Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.
High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.
10Gb/s Ethernet Performance and Retrospective, ACM Computer Communication Review, vol. 37, No. 2, pp. 89-92, Steven Pope and David Riddoch, Mar. 19, 2007.
Getting 10 Gb/s from Xen, Euro-Par Conference 2007, pp. 224-233, Rennes, France, Kieran Mansley, et al., Aug. 28, 2007.
Use of message-based multicomputer components to construct gigabit networks, ACM Computer Communication Review, vol. 23, No. 4, p. 32-44, Danny Cohen, et al., Jul. 1993.
The End of History, IEEE TCGN Gigabit Networking Workshop, J. Evans and T. Buller, Apr. 22, 2001.
The Cambridge Model Distributed System, ACM SIGOPS Operating Systems Review, vol. 14, Issue 1, pp. 21-29, M.V. Wilkes and R.M. Needham, Jan. 1980.
Devices in a Multi-Service Operating System, Paul Ronald Barham, Churchill College University of Cambridge, Jul. 1996, 142 pages.
On Making TCP More Robust to Packet Reordering, ACM Computer Communication Review, vol. 32, No. 1, E. Blanton and M. Allman, Jan. 2002.
The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.
Architectural and Performance Evaluation of GigaNet and Myrinet Interconnects on Clusters of Small-Scale SMP Sewers, Proceedings of the 2000 ACM/IEEE conference on Supercomputing, Dallas, Texas, Jenwei Hsieh, et al., Nov. 4, 2000.
Arsenic: A User-Accessible Gigabit Ethernet Interface, Proceedings of IEEE Infocom 2001, pp. 67-76, Ian Pratt and Keir Fraser, Apr. 22, 2001.
Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.
Topology Discovery for Large Ethernet Networks, ACM Computer Communication Review, vol. 31, No. 4, Bruce Lowekamp, et al., Oct. 2001.
EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.
A Case Study in Application I/O on Linux Clusters, Proceedings of the 2001 ACM/IEEE conference on Supercomputing, pp. 11, Denver, Robert Ross, et al., Nov. 10, 2001.

(56) References Cited

OTHER PUBLICATIONS

Characterizing Processor Architectures for Programmable Network Interfaces, Proceedings of the 14th international conference on Supercomputing, pp. 54-65, Santa Fe, New Mexico, Patrick Crowley, et al., May 8, 2000.
When The CRC and TCP Checksum Disagree, ACM Computer Communication Review, vol. 30, No. 4, pp. 309-319, Jonathan Stone and Craig Partridge, Oct. 2000.
Cramming more components onto integrated circuits, Electronics, vol. 38, No. 8, pp. 114-117, 1965, Gordon E. Moore, Apr. 19, 1965.
Programming Semantics for Multiprogrammed Computations, Communications of the ACM, vol. 9, No. 3, pp. 143-155, Jack B. Dennis and Earl C. Van Horn, Mar. 1966.
The Aloha System, ACM Computer Communication Review, vol. 4 No. 1, F.F. Kuo, Jan. 1974.
A Protocol for Packet Network Intercommunication, IEEE Transactions on Communications, vol. COM-22, No. 5, pp. 637-648, Vinton Cerf, Robert Kahn, May 1974.
Proposal for an International End-to-End Protocol, ACM Computer Communication Review, vol. 6 No. 1, p. 1-18, V. Cerf, et al., Jan. 1976.
Ethernet: distributed packet switching for local computer networks, Communications of the ACM, vol. 19, Issue 7, pp. 395-404, Robert M. Metcalfe and David R. Boggs, Jul. 1976.
Interrupt Driven Programming, Communications of the ACM, vol. 14, No. 6, p. 417-418, Marvin Zelkowits, Jun. 1971.
Synchronizing Processors with Memory-Content-Generated Interrupts, Communications of the ACM, vol. 16, No. 6, p. 350-351, J. Carver Hill, Jun. 1973.
Virtual cut-through: A new computer communication switching technique, Computer Networks, vol. 3, No. 4, pp. 267-286, P. Kermani and L. Kleinrock, Sep. 1979.
An Overview of the New Routing Algorithm for the ARPANET, Proceedings of the 6th Data Communications Symposium, p. 63, John M. McQuillan, et al., Nov. 1979.
Grapevine: An Exercise in Distributed Computing, Communications of the ACM, vol. 25, Issue 4, pp. 260-274, Andrew D. Birrell, et al., Apr. 1982.
The Architecture of the Universe Network, ACM Computer Communication Review, vol. 14, No. 2, pp. 2-9, Ian M. Leslie, et al., Jun. 1984.
Congestion Control in IP/TCP Internetworks, ACM Computer Communication Review, vol. 14, No. 4, p. 11-17, John Nagle, Oct. 1984.
Development of a TCP/IP for the IBM/370, ACM Computer Communication Review, vol. 15, No. 4, Robert M. Brandriff, et al., Sep. 1985.
Supercomputers on the Internet: A Case Study, ACM Computer Communication Review, vol. 17, No. 5, C. Kline, Aug. 1987.
Fragmentation Considered Harmful, ACM Computer Communication Review, vol. 17, No. 5, pp. 390-401, Christopher A. Kent, Jeffrey C. Mogul, Oct. 1987.
An Analysis of Memnet: An Experiment in High-Speed Shared-Memory Local Networking, ACM Computer Communication Review, vol. 18, No. 4, p. 165-174, Gary S. Delp, et al., Aug. 1988.
Measured Capacity of an Ethernet: Myths and Reality, ACM Computer Communication Review, vol. 18, No. 4, p. 222-234, David R. Boggs, et al., Aug. 1988.
The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.
Congestion Avoidance and Control, ACM Computer Communication Review, vol. 18, No. 4, p. 314-329, V. Jacobson, Aug. 1988.
The Design Philosophy of the DARPA Internet Protocols, ACM Computer Communication Review, vol. 18, No. 4, pp. 106-114, David D. Clark, Aug. 1988.
Development of the Domain Name System, ACM Computer Communication Review, vol. 18, No. 4, pp. 123-133, Paul V. Mockapetris and Kevin J. Dunlap, Aug. 1988.
Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.
Implementing TCP/IP on a Cray computer, ACM Computer Communication Review, vol. 19, No. 2, p. 11-15, David A. Borman, Apr. 1989.
Computing the Internet Checksum, ACM Computer Communication Review, vol. 19, No. 2, p. 86-94, R. Braden, et al., Apr. 1989.
An Analysis of TCP Processing Overhead, IEEE Communications Magazine, vol. 27, No. 6, pp. 23-29, David D. Clark, et al., Jun. 1989.
Sirpent: A High-Performance Internetworking Approach, ACM Computer Communication Review, vol. 19, No. 4, p. 158-169, David R. Cheriton, Sep. 1989.
Protocol Design for High Speed Networks, PhD Thesis, University of Cambridge, Derek Robert McAuley, Sep. 1989.
How Slow Is One Gigabit Per Second?, ACM Computer Communication Review, vol. 20, No. 1, p. 44-53, Craig Partridge, Jan. 1990.
Architectural Considerations for a New Generation of Protocols, ACM Computer Communication Review, vol. 20, No. 4, pp. 200-208, D. D. Clark and D. L. Tennenhouse, Sep. 1990.
Protocol Implementation on the Nectar Communication Processor, ACM Computer Communication Review, vol. 20, No. 4, p. 135-144, Eric C. Cooper, et al., Sep. 1990.
A Host-Network Interface Architecture for ATM, ACM Computer Communication Review, vol. 21, No. 4, Bruce S. Davie, Sep. 1991.
A High-Performance Host Interface for ATM Networks, ACM Computer Communication Review, vol. 21, No. 4, p. 317-325, C. Brendan S. Traw, Sep. 1991.
Fairisle: An ATM Network for the Local Area, ACM Computer Communication Review, vol. 21, No. 4, p. 327, Ian Leslie and Derek R. McAuley, Sep. 1991.
The Desk Area Network, ACM Operating Systems Review, vol. 25, Issue 4, p. 14-21, Mark Hayter and Derek McAuley, Oct. 1991.
An Integration of Network Communication with Workstation Architecture, ACM Computer Communication Review, vol. 21, No. 5, p. 18-29, 1991.
The Evolution of XTP, Proceedings of the Third International Conference on High Speed Networking,. Greg Chesson. Nov. 1991.
System support for multi-service traffic, University of Cambridge Computer Laboratory Technical Report No. 245, Michael J. Dixon, Jan. 1992.
ATOMIC: A Local Communication Network Created Through Repeated Application of Multicomputing Components, Made available by authors, Danny Cohen, Gregory Film, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.
Giving Applications Access to Gb/s Networking, IEEE Network, vol. 7, Issue 4, pp. 44-52, Jonathan M. Smith and C. Brendan S. Traw, Jul. 1993.
The Design and Evaluation of an Off-Host Communications Protocol Architecture, MSci Thesis, University of Virginia, Jeffrey R. Michel, Aug. 1993.

(56) References Cited

OTHER PUBLICATIONS

A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserwerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 8-17, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of a Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing a High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Extended European Search Report for European Application No. 17167635.6 dated Aug. 2, 2017.

* cited by examiner

DATA PROCESSING SYSTEM WITH ROUTING TABLES

1. PRIOR APPLICATION DATA

This application is a continuation of, claims priority to and the benefit of U.S. patent application Ser. No. 14/519,065 entitled Data Processing System with Routing Tables filed Oct. 20, 2014 which is a continuation of, claims priority to and the benefit of U.S. patent application Ser. No. 11/982,109 entitled Data Processing System with Routing Tables filed Oct. 31, 2007 which is a divisional application of and claims priority to U.S. patent application Ser. No. 11/900,377 entitled User-Level Re-Initialization Instruction Interception filed Sep. 10, 2007, which is a continuation of and claims priority to PCT Application No. PCT/GB2006/000852 which was published as WO 2006/095184 on Sep. 14, 2006 and claims priority to Great Britain Patent Application No. 0506403.5 filed Mar. 30, 2005.

2. FIELD OF THE INVENTION

This disclosure relates to data processing systems.

3. RELATED ART

In the field of computer systems, it is generally necessary to determine an appropriate path by which to transmit instructions between elements of a computer. Typically, the path is defined by the operating system running on the computer, but it is known that other processes can intervene in some situations to alter the path that instructions take. For example, an application which wishes to use a hot-pluggable input-output device will take an instruction path which is determined by a hot-plug controller device according to the particular device which is resident in the system at that time.

For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. Existing data processing system suffer from various drawbacks in this regard.

In addition, in order to transmit data between data processors in a network such as an Ethernet network, data is formed into packets. Each packet includes a header specifying the destination of the data in the packet. In an Ethernet network the destination is typically specified by means of an Ethernet address, an Internet Protocol (IP) address and a Transmission Control Protocol (TCP) address.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Layers of the stack include an application and a socket provided by a socket library. The socket library is an application program interface (API) for building software applications. The socket library can carry out various functions, including creating descriptors and storing information. Additionally, there is an operating system (OS) comprising a TCP kernel and a proprietary TCP user-level stack.

In order to perform routing the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network. This is a drawback to the prior art.

It is further known that in computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below.

Multiple threads can exist within a single application process and can execute concurrently with access to all the memory of the application context. Thus, there may be multiple threads within each application wishing to access the shared memory. If more than one process or thread were permitted concurrent access to the memory then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory, the lock associated with the memory will enter a locked state, indicating that the memory cannot currently be accessed by other threads. When another thread (T) makes an attempt to access the memory while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained, then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space while it is being used can cause an entry to be added to a queue so as to indicate that the threads are awaiting access to the memory. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications.

It is also known for an application, on releasing a lock, to send a system call (syscall) to a driver within the operating system to initiate the sending of a wake-up call to waiting applications. The driver on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

Various embodiments are disclosed herein for overcoming the drawbacks in the prior art and for providing additional advantages and benefits for data processing systems and the methods associated therewith.

SUMMARY

To overcome the drawbacks of the prior art and provide additional benefits and features, a data processing system is disclosed. In one embodiment the system comprises an operating system for supporting processes such that each process is associated with one or more resources. The operating system is arranged to police the accessing by processes of resources so as to inhibit a process from accessing resources with which it is not associated, and being responsive to instructions of a certain type to re-initialize a process. Also part of this embodiment is an interface for interfacing between each process and the operating system. A memory is provided for storing state information for at least one process such that the state information is associated with a resource. In addition, the interface is arranged to analyze instructions from the processes to the operating system, upon detecting an instruction to re-initialize a process so as to be associated with a resource that is associated with pre-existing state information. This causes state information corresponding to that pre-existing state information to be stored in the memory as state information for the re-initialized process and to be associated with the resource.

In one embodiment, a data processing system is arranged to control access by a plurality of processes to a region of shared memory. In such an embodiment, the data processing system is configured to prevent more than one process from concurrently accessing the region of shared memory and establish a data structure for holding items of a first type. These each comprise an indication of another of the plurality of processes, which are attempting to access the region of shared memory, and a definition of an operation on the region of shared memory. In addition, on a process finishing accessing the region of shared memory, action an item in the data structure by performing the defined operation by other than the process indicated in that item.

Also disclosed herein is a data processing system comprising an operating system for supporting processes such that the operating system is arranged to output data by addressing the data to a descriptor corresponding to the intended destination of the data. Also part of this embodiment is an interface for interfacing between each process and the operating system. A memory is provided including one or more address spaces and there is an address space corresponding to each of the processes for use by the respective process. Also, a data communication stack is provided or created for one of the processes such that the stack is located in the address space corresponding to the respective process and having a descriptor allocated to it. In this embodiment, the interface is arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

Also disclosed herein is a method of compiling a data structure in a computer system such that the computer system is arranged to perform protocol processing and transmit data via an interface on the basis of instructions in accordance with a route. In one embodiment this method comprises receiving a first instruction including an indication of a descriptor and determining a route indicated by the first instruction. This method also identifies an interface within the determined route and attempts to determine the ownership of the interface. As a result, this method causes an entry to be made in the data structure such that the entry includes an identifier of the descriptor and a state of the descriptor, wherein the state represents the result of the attempting step.

Also disclosed herein is a data processing system comprising an operating system that stores a first network routing table that comprises one or more entries each indicating at least part of a route over a network to a respective destination. The first network routing table may enable routing using various protocols such as, but not limited to, address resolution protocol, transmission control protocol, user datagram protocol, or a combination thereof.

In one or more embodiments, the operating system may be arranged to transmit data using the first network routing table. In addition, the operating system may maintain the first network routing table in various ways. For example, the operating system may be arranged to delete entries from the first network routing table if they are unused. The operating system may also be arranged to periodically delete, with a first frequency, unused entries from the first network routing table. In addition, the operating system may be signaled to maintain the first network routing table by a network data transmission function discussed below.

This system also comprises a transmission support function and a network data transmission function. In one or more embodiments, these functions may be defined by software which is executable by the data processing system. The transmission support function maintains a copy of the first network routing table to avoid frequent access to the first network routing table, and to avoid the task of maintaining a separate routing table independent of the operating system. The transmission support function may be internal or external to the operating system, and may function at user level. The copy of the first network routing table may be updated in various ways. For example, the operating system may be arranged to signal to the transmission support function when the first network routing table is updated. In addition, or alternatively, the transmission support function may be arranged to check the first network routing table for updates.

Generally, the network data transmission function allows transmission of data in accordance with the copy of the first network routing table without accessing the first network routing table. The network data transmission function may read the copy of the first network routing table through memory mapping which may be read only so as to prevent alteration of the routing table. Transmission of data may occur in various ways. In one embodiment, the network data transmission function may transmit data in the form of packets by creating packet headers for such packets based on information in the copy of the first network routing table.

The network data transmission function may be arranged to transmit to the operating system signals for causing the operating system to maintain entries in the first network routing table. These signals may be dedicated messages for maintaining tables in the operating system. In one or more embodiments the signals may comprise address resolution protocol reinforce messages. The signals may be sent periodically with a second frequency which may be greater than the operating system's first frequency for maintaining the first network routing table, as discussed above.

In this way, a network endpoint of the data processing system herein, may be arranged such that the network endpoint is unable to access the first network routing table directly, but still capable of network communication. The system may also have a counter which increments each time a change is made to the first network routing table. In one or more embodiments, such counter may be used to identify that cached data or other state data within the system may be inconsistent due to the change.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

The embodiments of the invention described herein may include any one or more of the features described in relation to other inventions. As such various different embodiments may be configured with any element, feature, or step, disclosed herein, either alone or in combination.

Figure 2:
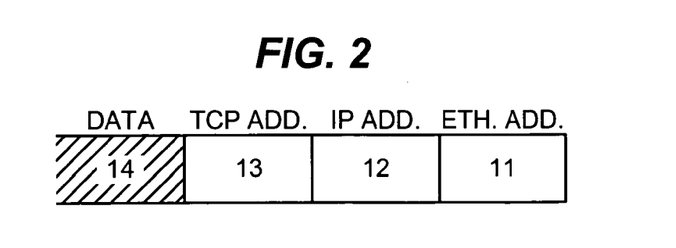
FIG. 2 represents a typical prior art data packet.

This invention relates to routing data within a computer system, and in particular but not exclusively to routing data within a network. In order to transmit data between data processors in a network such as an Ethernet network, data is formed into packets. Each packet includes a header specifying the destination of the data in the packet. In an Ethernet network the destination is typically specified by means of an Ethernet address 11, an Internet Protocol (IP) address 12 and a Transmission Control Protocol (TCP) address 13 as illustrated in FIG. 2.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Figure 1:
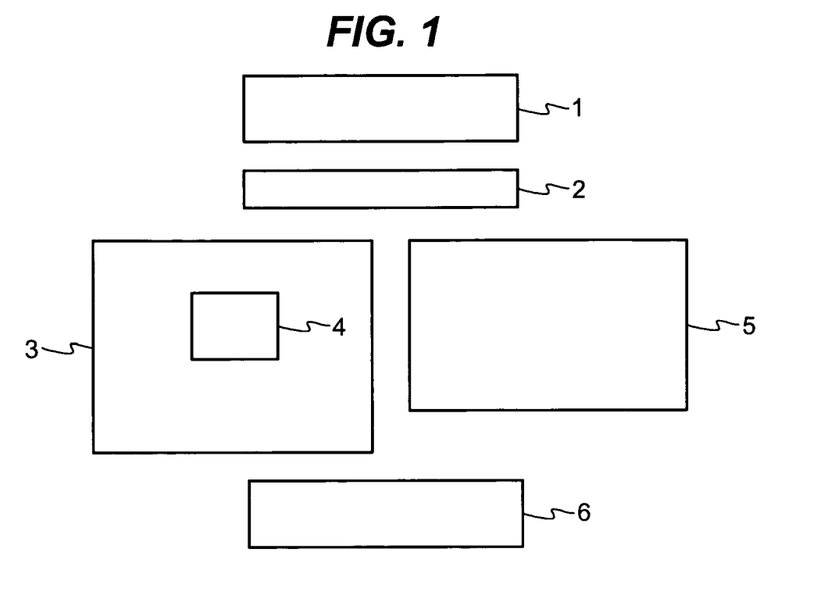
FIG. 1 shows a prior art computer system.

FIG. 1 shows components implementing a TCP stack. Layers of the stack include an application 1 and a socket 2 provided by a socket library. The socket library is an application program interface (API) for building software applications. The socket library can carry out various functions, including creating descriptors and storing information. Additionally, there is an operating system (OS) 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 1. The hardware could be a network interface card (NIC).

In order to perform routing, the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. However, in order to preserve the integrity of the tables that it stores, the OS is likely to perform security checks on any accesses to the tables. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network.

According to a first aspect of the present invention there is provided a data processing system comprising: an operating system that stores a first network routing table comprising one or more entries each indicating at least part of a route over a network to a respective destination; a transmission support function arranged to maintain a copy of the first network routing table; and a network data transmission function arranged to transmit data in accordance with the copy network routing table and without accessing the first network routing table.

The transmission support function could conveniently be internal to the operating system. The network data transmission function could be external to the operating system. The network data transmission function is preferably at user level.

The first network routing table could comprise data enabling routing using address resolution protocol. The first network routing table could comprise data enabling routing using transmission control protocol and/or user datagram protocol.

The operating system could be arranged to signal to the transmission support function when data stored in the first network routing table is updated. The transmission support function is preferably arranged to check the first network routing table for updates. The network data transmission function is preferably arranged to read the copy network routing table by means of memory mapping, and the memory mapping is preferably read only memory mapping.

The data processing system may further comprise a network endpoint and the system could be arranged such that the network endpoint is unable to access the first network routing table directly. The data processing system preferably has a counter and is preferably arranged to maintain the counter by incrementing it each time a change is made to the first network routing table. The operating system may be arranged to transmit data using the first network routing table.

The network data transmission function is preferably arranged to transmit the data in accordance with the copy network routing table in the form of packets and to create packet headers for such packets based on information in the copy network routing table.

The operating system may be arranged to delete entries from the first network routing table if they are unused. The operating system may be arranged to periodically delete, with a first frequency, unused entries from the first network routing table.

The network data transmission function may be arranged to transmit to the operating system signals for causing the operating system to maintain entries in the network routing table. The signals are preferably dedicated messages for maintaining tables in the operating system. The signals could be address resolution protocol reinforce messages. The signals may be sent periodically with a second frequency, and the second frequency is preferably greater than the first frequency.

According to a second aspect of the present invention there is provided software for execution by a data processing system comprising: an operating system that stores a first network routing table comprising one or more entries each indicating at least part of a route over a network to a respective destination; the software defining: a transmission support function arranged to maintain a copy of the first network routing table; and a network data transmission function arranged to transmit data in accordance with the copy network routing table and without accessing the first network routing table. According to a third aspect of the present invention there is provided a data carrier carrying software as defined above.

In the system to be described below a driver accesses routing tables stored by the kernel of the operating system. The driver preferably resides in the operating system so as to readily access the operating system's routing tables. The driver maintains a copy of the operating system's routing tables: conveniently in memory to which the driver has write access and to which a user-level networking function of the system has read access without performing calls on the operating system. The user-level networking function then performs network data transmission operations using the copy routing tables rather than those maintained directly by the kernel. This avoids the need for it to involve the kernel when accessing those tables, which it may preferably do by virtue of a memory mapping.

Figure 3:
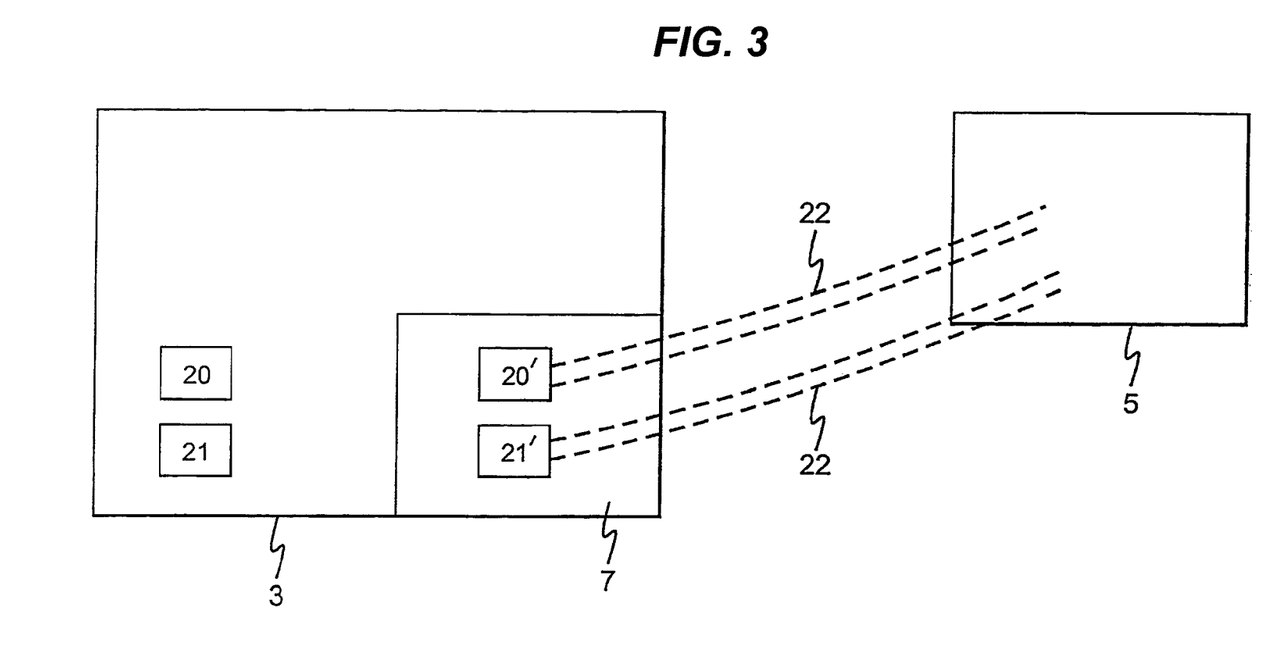
FIG. 3 shows components of a computer system in accordance with embodiments of the present invention.

FIG. 3 shows an OS 3 in a computer system having a TCP user-level stack 5. The OS is provided with a TCP driver or helper 7 supporting the stack 5. Routing tables 20, 21 are maintained in the OS which specify the rules for routing data within a network including the computer system of FIG. 3. The tables could be a TCP routing table 20 (which could also be used for UDP) and an address resolution protocol (ARP) table 21. They specify details such as the interfaces and gateways through which data should be transmitted in order for it to reach a particular destination within the network. The present system may be applied to all routing tables in a system, or only to one or more selected tables. The tables may be for Ethernet protocols such as TCP or for other network protocols.

When an application within the computer system of FIG. 3 wishes to transmit a packet of data it needs to access the tables 20, 21 in order to create an appropriate header to ensure that the packet is routed correctly through the network. When TCP packets are to be sent, copies of the tables 20', 21' which are maintained in the TCP driver 7 are accessed by the socket library 2 to avoid the necessity to access the tables directly in the OS. Memory mapping 22 between the driver 7 and the user-level TCP stack 5 enables the stack 5 to access the copy tables 20', 21'. Thus, the socket library can simply access the stack 5 in order to obtain the required information from the tables 20, 21. Instead of a memory mapping, all the data defining the tables or updates to them could be transmitted from the driver 7 to the stack 5. However, this would be less efficient.

In order to avoid locking requirements between TCP endpoints which would otherwise be required, each endpoint maintains a generation counter which is incremented as a result of a routing table callback, or any other state change such as an ARP timeout (discussed below) which would render state cached at the endpoints inconsistent. If a TCP endpoint detects that its generation counter has been incremented then it will leave its fast path, which involves accessing cached interface and packet header information, and will instead consult the user-level stack's tables.

It is preferable for the mapping 22 between the driver 7 and the user-level stack 5 to be read only. This prevents the stack 5 from corrupting data in the OS by writing directly to it. Corruption of the original tables would adversely affect other applications running on the OS. In a preferred embodiment the user-level stack 5 is a Level 5 (or L5) stack. The driver 7 is a corresponding L5 driver.

In order to keep the copy tables up-to-date, the driver 7 registers with the OS to obtain updates of the routing tables via call backs. By this means new data in the tables 20, 21 can either be passed directly from the OS to the driver 7, or alternatively the driver 7 could simply be informed when a change is made to the tables and subsequently access the tables to obtain the new information. Either of these arrangements allows the driver to maintain up-to-date tables without altering the data in the original tables 20, 21.

When a TCP packet is to be sent, the data to be transmitted is written to shared memory, and an indication of the destination is passed to the user-level stack. The user-level stack checks in locally stored data to establish whether it already has access to the Ethernet address of the destination. If so, it forms and sends the Ethernet packet directly. If not, it sends a call to the driver which checks its tables 20', 21' to establish the relevant address. If the Ethernet address is not known to the driver, the driver can issue an ARP request for the address over the network. Once a response is received via the OS, the packet can be formed and sent by the user-level stack.

Since ARP is a dynamic protocol, entries in the ARP table 21 are held for a predetermined time, say 30 seconds, and then removed if they have not been used. By "used" may be meant accessed for any purpose, although some systems may remove entries if they have been accessed only for a defined subset of purposes in the predetermined time. Although entries in the tables 20, 21 may not have been accessed directly, they may have been used indirectly in the copy tables 20', 21'. Thus, it could appear to the OS that the entries are redundant even if they are in fact still in use. It is therefore desirable to cause the OS to continue to hold entries which are only being used indirectly through the copy tables rather than permitting them to be deleted after a time-out. In order to achieve this, an embodiment of the invention requires the L5 driver to run a timer which counts the time since an entry was made in the ARP table 21 and when the predetermined time period is reached, the entry is "reinforced" in the table 21 by means of a duplicate entry being sent to the OS by the driver 7. The predetermined time period counted by the timer is preferably slightly less than the time-out of the ARP table. For example, if the ARP time-out is 30 seconds, the predetermined time period of the timer could be 28 seconds. In this way, a duplicate entry is made in the table just before the previous entry is removed so that there is no time at which an entry for the particular address is not present in the main ARP table 21.

In the preferred embodiment this "reinforce" procedure is carried out for selected ARP entries as follows. The driver checks a table shared with the user-level stack 5 listing active endpoints in the network. If an ARP table entry is for one of these active endpoints then the entry will be reinforced by the driver. Otherwise, it can be allowed to be removed by the OS.

The procedures described above can all operate without the addressor system (i.e. the user-level stack) being aware that there is any difference compared with a standard system configuration in which the OS is accessed directly for address data. The driver could be located outside the operating system if the operating system supported providing it with suitable access to the routing tables.

The computer system could be a multi-purpose device such as a personal computer or a server. Alternatively, it could be a dedicated device such as a network-attached storage (NAS) or web server device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A data processing system comprising:
one or more physical memories; and
one or more physical processors configured to provide:
an operating system that stores at least one first network routing table each comprising one or more entries, each entry indicating at least part of a route over a network to a respective destination, wherein the at least one first network routing table is maintained in a kernel of the operating system;
a transmission support function at a user level configured to maintain a copy of at least part of the at least one first network routing table;
a network data transmission function arranged to transmit data by accessing the copy, of the at least part of the at least one first network routing table, maintained at the user level and without accessing the at least one first network routing table in the kernel; and
an application configured to provide an indication of a destination of a packet to the network data transmission function and the network data transmission function configured to obtain an address of the destination from the copy of the at least part of the at least one first network routing table.

2. A data processing system as claimed as claim 1, wherein the network data transmission function is external to the operating system.

3. A data processing system as claimed in claim 1, wherein the network data transmission function is at user level.

4. A data processing system as claimed in claim 1, wherein the at least one first network routing table comprises data enabling routing using address resolution protocol.

5. A data processing system as claimed in claim 1, wherein the at least one first network routing table comprises data enabling routing using transmission control protocol and/or user datagram protocol.

6. A data processing system as claimed in claim 1, wherein the operating system is configured to signal when data stored in the at least one first network routing table is updated.

7. A data processing system as claimed in claim 1, wherein said data processing system is configured to check the at least one first network routing table for updates.

8. A data processing system as claimed in claim 1, wherein the copy of the at least part of the at least one first network routing table is configured to be read by means of memory mapping.

9. A data processing system as claimed in claim 8, wherein the memory mapping is read only memory mapping.

10. A data processing system as claimed in claim 1, further comprising a network endpoint, wherein the system is arranged such that the network endpoint is unable to access the at least one first network routing table directly.

11. A data processing system as claimed in claim 1, further configured to provide: a counter that is incremented each time a change is made to the at least one first network routing table.

12. A data processing as claimed in claim 1, wherein the operating system is arranged to transmit data using the at least one first network routing table.

13. A data processing as claimed in claim 1, wherein the network data transmission function is arranged to transmit the data in the form of packets and to create packet headers for such packets based on information in the copy of the at least part of the at least one first network routing table.

14. A data processing as claimed in claim 1, wherein the data processing system is arranged to delete entries from the at least one first network routing table if they are unused.

15. A data processing system as claimed in claim 14, wherein the data processing system is arranged to periodically delete, with a first frequency, unused entries from the at least one first network routing table.

16. A data processing system as claimed in claim 15, wherein the network data transmission function is arranged to transmit to the operating system signals for causing the operating system to maintain entries in the at least one first network routing table.

17. A data processing system as claimed in claim 16, wherein the signals are dedicated messages for maintaining tables in the operating system.

18. A data processing system as claimed in claim 16, wherein the signals are address resolution protocol reinforce messages.

19. A data processing system as claimed in claim 16, wherein the signals are sent periodically with a second frequency.

20. A data processing system as claimed in claim 19, wherein the second frequency is greater than the first frequency.

21. A method for transmitting data from a data processing system comprising one or more physical memories and one or more physical processors, the method comprising:
    storing in an operating system at least one first network routing table each comprising one or more entries, each entry indicating at least part of a route over a network to a respective destination, wherein the at least one first network routing table is maintained in a kernel of the operating system;
    maintaining in a transmission support function at a user level, a copy of at least part of the at least one first network routing table;
    transmitting, by a network data transmission function, data by accessing the copy, of the at least part of the at least one first network routing table, maintained at the user level and without accessing the at least one first network routing table in the kernel;
    providing, by an application, an indication of a destination of a packet to the network data transmission function; and
    obtaining, by the network data transmission function, an address of the destination from the copy of the at least part of the at least one first network routing table.

22. A non-transitory computer readable storage medium storing software which when executed by a data processing system comprising one or more physical memories and one or more physical processors performs the steps of:
    storing in an operating system at least one first network routing table each comprising one or more entries, each entry indicating at least part of a route over a network to a respective destination, wherein the at least one first network routing table is maintained in a kernel of the operating system;
    maintaining in a transmission support function at a user level, a copy of at least part of the at least one first network routing table;
    transmitting, by a network data transmission function, data by accessing the copy, of the at least part of the at least one first network routing table, maintained at the user level and without accessing the at least one first network routing table in the kernel;
    providing, by an application, an indication of a destination of a packet to the network data transmission function; and
    obtaining, by the network data transmission function, an address of the destination from the copy of the at least part of the at least one first network routing table.

* * * * *